(12) United States Patent
Tiirola et al.

(10) Patent No.: US 12,707,404 B2
(45) Date of Patent: Aug. 11, 2026

(54) TRANSMISSION POWER MANAGEMENT

(71) Applicant: Nokia Technologies Oy, Espoo (FI)

(72) Inventors: Esa Tapani Tiirola, Oulu (FI); Arto Lehti, Massy (FR); Axel Mueller, Massy (FR); Amir Mehdi Ahmadian Tehrani, Munich (DE)

(73) Assignee: Nokia Technologies Oy, Espoo (FI)

( * ) Notice: Subject to any disclaimer, the term of this patent is extended or adjusted under 35 U.S.C. 154(b) by 323 days.

(21) Appl. No.: 18/559,394

(22) PCT Filed: May 11, 2021

(86) PCT No.: PCT/EP2021/062459
§ 371 (c)(1),
(2) Date: Nov. 7, 2023

(87) PCT Pub. No.: WO2022/237968
PCT Pub. Date: Nov. 17, 2022

(65) Prior Publication Data
US 2024/0244539 A1 Jul. 18, 2024

(51) Int. Cl.
*H04W 52/36* (2009.01)
*H04W 52/22* (2009.01)

(52) U.S. Cl.
CPC ....... *H04W 52/367* (2013.01); *H04W 52/228* (2013.01)

(58) Field of Classification Search
CPC ... H04W 52/36; H04W 52/376; H04W 52/22; H04W 52/228
See application file for complete search history.

(56) References Cited

U.S. PATENT DOCUMENTS 8,538,351 B2 * 9/2013 Wilson ..................... H04B 1/04 455/127.1
8,774,853 B2 * 7/2014 Wilson ................ H04W 52/246 455/522

(Continued)

FOREIGN PATENT DOCUMENTS

EP 2410661 B1 * 10/2014 .......... H04B 1/3838

OTHER PUBLICATIONS

"3rd Generation Partnership Project; Technical Specification Group Radio Access Network; Study on NR coverage enhancements (Release 17)", 3GPP TR 38.830, V17.0.0, Dec. 2020, pp. 1-91.

(Continued)

*Primary Examiner* — Hai V Nguyen
(74) *Attorney, Agent, or Firm* — Barta Jones, PLLC

(57) ABSTRACT

Certain examples of the present disclosure relate to a User Equipment, UE, (110) comprising means for: determining a first total amount of energy ($E_{Tx(TW1)}$) that has been transmitted by the UE within a first time window (TW1); and determining a first transmission power ($P_{maxTx(i)}$) that is allowed for a transmission ($Tx_{(i)}$) by the UE within the first time window, TW1 wherein the first transmission power is determined based, at least in part, on the first total amount of energy ($E_{Tx(TW1)}$) that has been transmitted by the UE within the first time window (TW1).

13 Claims, 5 Drawing Sheets

(56) References Cited

U.S. PATENT DOCUMENTS

| | | | | |
|---|---|---|---|---|
| 9,054,780 | B2 * | 6/2015 | Wilson | H04W 52/146 |
| 10,439,789 | B2 | 10/2019 | Brunel et al. | |
| 10,652,833 | B2 | 5/2020 | Nadakuduti et al. | |
| 10,893,491 | B2 | 1/2021 | Kazmi et al. | |
| 10,965,335 | B1 * | 3/2021 | Jadhav | H04B 1/3838 |
| 11,595,072 | B2 * | 2/2023 | Zhang | H04W 52/365 |
| 11,817,926 | B2 * | 11/2023 | Gopal | H04B 7/0602 |
| 11,990,929 | B2 * | 5/2024 | Zhang | H04W 28/0268 |
| 12,149,310 | B2 * | 11/2024 | Gopal | H04B 7/0602 |
| 12,177,797 | B2 * | 12/2024 | Nadakuduti | H04W 52/42 |
| 12,184,321 | B2 * | 12/2024 | Chen | H04B 1/3838 |
| 2012/0021800 | A1 * | 1/2012 | Wilson | H04W 72/02<br>455/127.1 |
| 2013/0252658 | A1 * | 9/2013 | Wilson | H04W 52/246<br>455/522 |
| 2014/0248892 | A1 * | 9/2014 | Wilson | H04B 1/04<br>455/561 |
| 2020/0258296 | A1 * | 8/2020 | Pennings | G06T 15/205 |
| 2020/0314771 | A1 | 10/2020 | Frank | |
| 2022/0104144 | A1 * | 3/2022 | Grabelkovsky | H04W 52/223 |
| 2025/0106777 | A1 * | 3/2025 | Lee | G06F 1/26 |

OTHER PUBLICATIONS

"New SID: Optimizations of pi/2 BPSK uplink power in NR", 3GPP TSG RAN Meeting #91e, RP-210910, Agenda: 9.1.5, Huawei, Mar. 22-26, 2021, 4 pages.

"Non-Ionizing Radiation, Part 2: Radiofrequency Electromagnetic Fields", IARC Monographs on the Evaluation of Carcinogenic Risks to Humans, vol. 102, 2013, 481 pages.

"SAR Measurement Procedures for 802.11 a/b/g Transmitters", Federal Communications Commission, Oct. 2006, 18 pages.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"3rd Generation Partnership Project; Technical Specification Group Radio Access Network; NR; Physical layer procedures for control (Release 16)", 3GPP TS 38.213, V16.5.0, Mar. 2021, pp. 1-183.

Sarwar et al., "Reinforcement Learning Based Adaptive Duty Cycling in LR-WPANs", IEEE Access, vol. 8, Sep. 1, 2020, pp. 161157-161174.

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.1.0, Mar. 2021, pp. 1-513.

International Search Report and Written Opinion received for corresponding Patent Cooperation Treaty Application No. PCT/EP2021/062459, dated Feb. 9, 2022, 11 pages.

* cited by examiner

| LCG ID | Buffer Size | Oct 1 |
|---|---|---|

| LCG$_7$ | LCG$_6$ | LCG$_5$ | LCG$_4$ | LCG$_3$ | LCG$_2$ | LCG$_1$ | LCG$_0$ | Oct 1 |
|---|---|---|---|---|---|---|---|---|
| Buffer Size 1 | | | | | | | | Oct 2 |
| Buffer Size 2 | | | | | | | | Oct 3 |
| ... | | | | | | | | |
| Buffer Size m | | | | | | | | Oct m+1 |

TRANSMISSION POWER MANAGEMENT

RELATED APPLICATION

This application was originally filed as PCT Application No. PCT/EP2021/062459, filed on May 11, 2021 which is incorporated herein by reference in its entirety.

TECHNOLOGICAL FIELD

Examples of the present disclosure relate to the management of transmission power. Some examples, though without prejudice to the foregoing, relate to determining a transmission power for User Equipment.

BACKGROUND

It is possible to increase User Equipment, UE, uplink, UL, power—i.e., perform a 'power boost' for UE transmissions. For example, a power boost can be applied to transmissions in certain Time Division Duplex, TDD, bands for pi/2 Binary Phase Shift Keying, BPSK, modulation. It may be applied also for other scenarios, such as Frequency Domain Spectrum Shaping, FDSS, with spectrum extension utilizing Quadrature Phase Shift Keying, QPSK. This is another example where UE may be able to provide a higher transmission power. However, UL power boosts still need to abide by restrictions with regards to maximum permissible energy/power transmissions as stipulated by regulations (not least such as relating to maximum permitted energy/power, e.g., Specific Absorption Rate, SAR, or Equivalent Isotropic Radiated Power, EIRP, requirements).

Conventional schemes for UE transmission power management are not always optimal. In some circumstances it can be desirable to improve the management of UE transmission power, such as transmission power boosts. In some circumstances it can be desirable to improve the determination of an allowable UE transmission power, such that an increase in UE transmission power may be achieved (thereby enabling an increase in coverage extension and/or an increase in the reliability of transmissions) whilst still meeting regulatory transmission power and energy constraints.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The scope of protection sought for various embodiments of the invention is set out by the claims. Any embodiments, examples and features described in this specification that do not fall under the scope of the independent claims are to be interpreted as examples useful for understanding various embodiments of the invention.

According to at least some examples of the disclosure there is provided a User Equipment, UE, comprising means for:

determining a first total amount of energy that has been transmitted by the UE within a first time window; and determining a first transmission power that is allowed for a transmission by the UE within the first time window wherein the first transmission power is determined based, at least in part, on the first total amount of energy that has been transmitted by the UE within the first time window.

According to various, but not necessarily all, examples of the disclosure there is provided a method comprising:

determining a first total amount of energy that has been transmitted by the UE within a first time window; and determining a first transmission power that is allowed for a transmission by the UE within the first time window wherein the first transmission power is determined based, at least in part, on the first total amount of energy that has been transmitted by the UE within the first time window.

According to various, but not necessarily all, examples of the disclosure there is provided computer program instructions for causing an apparatus to perform:

determining a first total amount of energy that has been transmitted by the UE within a first time window; and determining a first transmission power that is allowed for a transmission by the UE within the first time window wherein the first transmission power is determined based, at least in part, on the first total amount of energy that has been transmitted by the UE within the first time window.

According to various, but not necessarily all, examples of the disclosure there is provided an apparatus comprising:

at least one processor; and at least one memory including computer program instructions;

the at least one memory and the computer program instructions configured to, with the at least one processor, cause the apparatus at least to perform:

determining a first total amount of energy that has been transmitted by the UE within a first time window; and determining a first transmission power that is allowed for a transmission by the UE within the first time window wherein the first transmission power is determined based, at least in part, on the first total amount of energy that has been transmitted by the UE within the first time window.

According to various, but not necessarily all, examples of the disclosure there is provided a non-transitory computer readable medium encoded with instructions that, when performed by at least one processor, causes at least the following to be perform:

determining a first total amount of energy that has been transmitted by the UE within a first time window; and determining a first transmission power that is allowed for a transmission by the UE within the first time window wherein the first transmission power is determined based, at least in part, on the first total amount of energy that has been transmitted by the UE within the first time window.

According to various, but not necessarily all, examples of the disclosure there is provided a chipset comprising processing circuitry configured to perform the above-mentioned method.

According to various, but not necessarily all, examples of the disclosure there is provided a module, device and/or system comprising means for performing the above-mentioned method.

The following portion of this 'Brief Summary' section describes various features that can be features of any of the examples described in the foregoing portion of the 'Brief Summary' section. The description of a function should additionally be considered to also disclose any means suitable for performing that function.

In some but not necessarily all examples, the first total amount of energy that has been transmitted by the UE within the first time window is determined based, at least in part, on: a second transmission power and a transmission duration of at least one transmission transmitted by the UE within the first time window.

In some but not necessarily all examples, the UE, further comprises means for determining the transmission duration of the at least one transmission based on a number of symbols transmitted in the at least one transmission.

In some but not necessarily all examples, the first transmission power is further determined based, at least in part, on: an allowed transmission energy wherein the allowed transmission energy is indicative of a second total amount of energy permitted to be transmitted by the UE over the first time window.

In some but not necessarily all examples, the first transmission power is further determined based, at least in part, on:

- a first available transmission energy for the transmission wherein the first available transmission energy for the transmission is determined, based at least in part, on a difference between:
  - the allowed transmission energy and
  - the first total amount of energy that has been transmitted by the UE within the first time window.

In some but not necessarily all examples, the first available transmission energy for the transmission is further adjusted by a first parameter value, wherein the first parameter value is either signalled to the UE or is predefined.

In some but not necessarily all examples, the first transmission power is further determined based, at least in part, on:

- a third transmission power wherein the third transmission power is indicative of a transmission power that is available for the UE for the transmission wherein the third transmission power is determined based, at least in part, on:
  - the first available transmission energy; and
  - a duration of the transmission or a number of symbols in the transmission.

In some but not necessarily all examples, the first transmission power is defined as a minimum of:

- the third transmission power and
- a fourth transmission power wherein the fourth transmission power is indicative of a predetermined maximum transmission power that is permitted for the UE.

In some but not necessarily all examples, the UE further comprises means for:

- adjusting, based at least in part on the first transmission power a transmission power parameter for controlling the transmission power of the UE.

In some but not necessarily all examples, the UE further comprises means for:

- controlling the UE's transmission power based, at least in part, on the first transmission power.

In some but not necessarily all examples, the UE further comprises means for:

- determining a third total amount of energy that has been, or is to be, transmitted by the UE within a second time window wherein the second time window is within the first time window; and
- wherein the first transmission power is further determined based, at least in part, on the third total amount of energy that has been, or is to be, transmitted by the UE within the second time window.

In some but not necessarily all examples, the second time window has a length that is less than the length of the first time window by predefined amount or a configured amount; and/or

- a fourth total amount of energy permitted to be transmitted by the UE over the second time window is smaller than the second total amount of energy permitted to be transmitted by the UE over the first time window by predefined amount or a configured amount.

In some but not necessarily all examples, the UE further comprises means for:

- determining a second available transmission energy for the transmission, wherein the second available transmission energy for the transmission is indicative of a difference between:
  - the fourth total amount of energy permitted to be transmitted by the UE over the second time window, and
  - the third total amount of energy that has been, or is to be, transmitted by the UE within the second time window.

In some but not necessarily all examples, the second available transmission energy for the transmission is further adjusted by a second parameter value, wherein the second parameter value is either signalled to the UE or is predefined.

In some but not necessarily all examples, the UE further comprises means for:

- determining a third available transmission energy, wherein the third available transmission energy is defined as the minimum of:
  - the first available transmission energy, and
  - the second available transmission energy.

In some but not necessarily all examples, the UE further comprises means for signalling, to an access node, one or more of:

- a request to alter a maximum duty cycle for the UE;
- information for defining the length and temporal location of the first time window;
- the first total amount of energy, that has been transmitted by the UE within the first time window; and
- the first transmission power.

In some but not necessarily all examples, the UE further comprises means for:

- determining traffic information for data to be transmitted; and
- controlling the UE's transmission power for transmitting the data based, at least in part, on the traffic information.

According to at least some examples of the disclosure there is provided a Radio Access Network, RAN, node, comprising means for:

- configuring a User Equipment, UE, to determine a first total amount of energy that has been transmitted by the UE within a first time window; and
- configuring the UE to determine a first transmission power that is allowed for a transmission by the UE within the first time window wherein the first transmission power is determined based, at least in part, on the first total amount of energy that has been transmitted by the UE within the first time window.

In some but not necessarily all examples, the RAN node further comprises means for receiving, from the UE, an indication that the UE supports a particular type of UE transmission power boost; and wherein said configuring of the UE is based, at least in part on the received indication.

According to various, but not necessarily all, examples of the disclosure there is provided a method for a Radio Access Network, RAN, node, the method comprising:

configuring a User Equipment, UE, to determine a first total amount of energy that has been transmitted by the UE within a first time window; and configuring the UE to determine a first transmission power that is allowed for a transmission by the UE within the first time window wherein the first transmission power is determined based, at least in part, on the first total amount of energy that has been transmitted by the UE within the first time window.

According to various, but not necessarily all, examples of the disclosure there is provided computer program instructions for causing a Radio Access Network, RAN, node to perform:

configuring a User Equipment, UE, to determine a first total amount of energy that has been transmitted by the UE within a first time window; and configuring the UE to determine a first transmission power that is allowed for a transmission by the UE within the first time window wherein the first transmission power is determined based, at least in part, on the first total amount of energy that has been transmitted by the UE within the first time window.

According to various, but not necessarily all, examples of the disclosure there is provided an apparatus comprising:

at least one processor; and at least one memory including computer program instructions;

the at least one memory and the computer program instructions configured to, with the at least one processor, cause the apparatus at least to perform:

configuring a User Equipment, UE, to determine a first total amount of energy that has been transmitted by the UE within a first time window; and configuring the UE to determine a first transmission power that is allowed for a transmission by the UE within the first time window wherein the first transmission power is determined based, at least in part, on the first total amount of energy that has been transmitted by the UE within the first time window.

According to various, but not necessarily all, examples of the disclosure there is provided a non-transitory computer readable medium encoded with instructions that, when performed by at least one processor, causes at least the following to be perform:

configuring a User Equipment, UE, to determine a first total amount of energy that has been transmitted by the UE within a first time window; and configuring the UE to determine a first transmission power that is allowed for a transmission by the UE within the first time window wherein the first transmission power is determined based, at least in part, on the first total amount of energy that has been transmitted by the UE within the first time window.

According to various, but not necessarily all, examples of the disclosure there is provided a chipset comprising processing circuitry configured to perform the above-mentioned method.

According to various, but not necessarily all, examples of the disclosure there is provided a module, device and/or system comprising means for performing the above-mentioned method.

According to various, but not necessarily all, examples of the disclosure there are provided examples as claimed in the appended claims.

While the above examples of the disclosure and optional features are described separately, it is to be understood that their provision in all possible combinations and permutations is contained within the disclosure. Also, it is to be understood that various examples of the disclosure can comprise any or all of the features described in respect of other examples of the disclosure, and vice versa.

BRIEF DESCRIPTION OF THE DRAWINGS

Some examples will now be described with reference to the accompanying drawings in which.

Figures 1, 2:
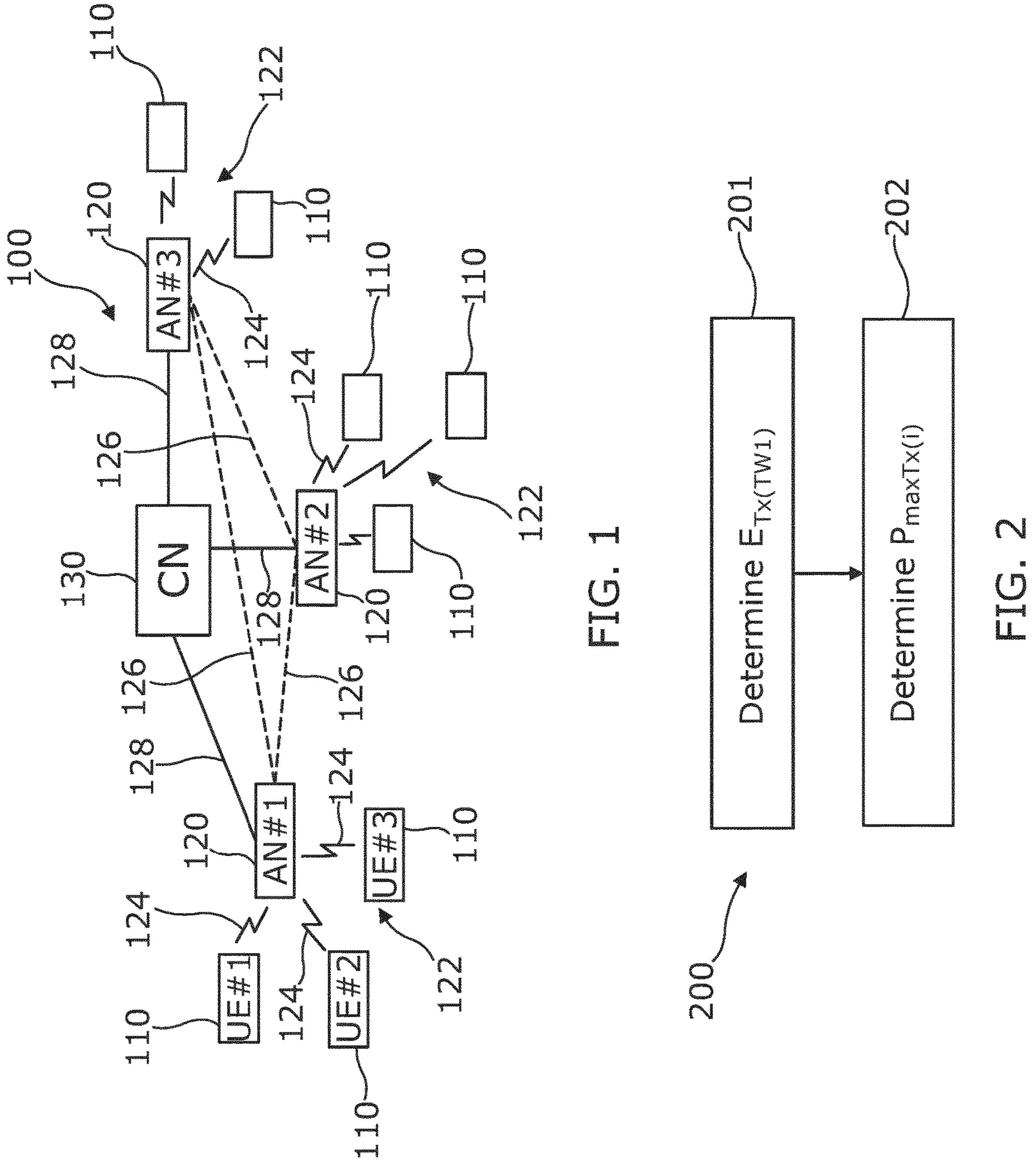
FIG. 1 shows an example of the subject matter described herein.
FIG. 2 shows another example of the subject matter described herein.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

In the drawings (and description) a similar feature may be referenced by the same three-digit number. In the drawings (and description), an optional subscript to the three-digit number can be used to differentiate different instances of similar features. Therefore, a three-digit number without a subscript can be used as a generic reference and the three-digit number with a subscript can be used as a specific reference. A subscript can comprise a single digit that labels different instances. A subscript can comprise two digits including a first digit that labels a group of instances and a second digit that labels different instances in the group.

| ABREVIATIONS/DEFINITIONS | |
|---|---|
| ACLR | Adjacent Channel Leakage Power Ratio |
| BPSK | Binary Phase Shift Keying |
| BSR | Buffer Status Report |
| CP | Cyclic Prefix |
| CSI | Channel State Information |
| DFT-S-OFDM | Discrete Fourier Transform Spread OFDM |
| EIRP | Effective Isotropic Radiated Power |
| EVM | Error Vector Magnitude |

-continued

| ABREVIATIONS/DEFINITIONS | |
|---|---|
| FDSS | Frequency Domain Spectrum Shaping |
| gNB | NR Base station |
| IBE | In-Band Emissions |
| IIR | Infinite Impulse Response |
| MAC | Medium Access Control |
| MPR | Maximum Power Reduction |
| NR | New Radio |
| OCB | Occupied Channel Bandwidth |
| OFDM | Orthogonal Frequency Division Multiplexing |
| PAPR | Peak-to-Average Power Ratio |
| PHR | Power Headroom Report |
| PUCCH | Physical Uplink Control Channel |
| PUSCH | Physical Uplink Shared Channel |
| QPSK | Quadrature Phase Shift Keying |
| RAN | Radio Access Network |
| RRC | Radio Resource Control |
| SAR | Specific Absorption Rate |
| TDD | Time Division Duplexing |
| TSDSI | Telecommunications Standards Development Society India |
| Tx | Transmission/Transmit |
| UE | User Equipment |
| UL | Uplink |

DETAILED DESCRIPTION

FIG. 1 schematically illustrates an example of a network 100 comprising a plurality of network nodes including terminal nodes 110 (also referred to as User Equipment, UE), access nodes 120 and one or more core nodes 130. The terminal nodes 110 and access nodes 120 communicate with each other. The access nodes 120 communicate with the one or more core nodes 130. The one or more core nodes 130 may, in some but not necessarily all examples, communicate with each other. The one or more access nodes 120 may, in some but not necessarily all examples, communicate with each other.

The network 100 is in this example a radio telecommunications network, i.e., a Radio Access Network, RAN, in which at least some of the terminal nodes 110 and access nodes 120 communicate with each other using transmission/reception of radio waves.

The RAN 100 may be a cellular network comprising a plurality of cells 122 each served by an access node 120. The access nodes 120 comprise cellular radio transceivers. The terminal nodes 110 comprise cellular radio transceivers.

In the particular example illustrated, the network 100 is a Next Generation (NG) or New Radio (NR) network. NR is the Third Generation Partnership Project (3GPP) name for 5G technology.

The interfaces between the terminal nodes 110 and the access nodes 120 are radio interfaces 124 (e.g., Uu interfaces). The interfaces between the access nodes 120 and one or more core nodes 130 are backhaul interfaces 128 (e.g., S1 and/or NG interfaces).

Depending on the exact deployment scenario, the access nodes 120 can be RAN nodes such as NG-RAN nodes. NG-RAN nodes may be gNodeBs (gNBs) that provide NR user plane and control plane protocol terminations towards the UE. NG-RAN nodes may be New Generation Evolved Universal Terrestrial Radio Access network (E-UTRAN) NodeBs (ng-eNBs) that provide E-UTRA user plane and control plane protocol terminations towards the UE. The gNBs and ng-eNBs may be interconnected with each other by means of Xn interfaces. The gNBs and ng-eNBs are also connected by means of NG interfaces to the 5G Core (5GC), more specifically to the AMF (Access and Mobility Management Function) by means of the NG-C interface and to the UPF (User Plane Function) by means of the NG-U interface. The access nodes 120 may be interconnected with each other by means of Xn interfaces 126. The cellular network 100 could be configured to operate in licensed or unlicensed frequency bands, not least such as a 60 GHz unlicensed band where beamforming is mandatory in order to achieve required coverage.

The access nodes 120 can be deployed in a NR standalone operation/scenario. The access nodes 120 can be deployed in a NR non-standalone operation/scenario. The access nodes can be deployed in a Carrier Aggregation operation/scenario. The access nodes 120 can be deployed in a dual connectivity operation/scenario, i.e., Multi Radio Access Technology-Dual Connection (MR-DC), not least for example such as:

Evolved Universal Terrestrial Radio Access-New Radio Dual Connectivity (EUTRA-NR-DC, also referred to as EN-DC), New Radio-Evolved Universal Terrestrial Radio Access Dual Connectivity (NR-EUTRA-DC, also referred to as NE-DC), Next Generation Radio Access Network Evolved Universal Terrestrial Radio Access-New Radio Dual Connectivity (NG-RAN E-UTRA-NR Dual Connectivity, also referred to as NGEN-DC), or New Radio Dual Connectivity (also referred to as NR-DC).

In such non-standalone/dual connectivity deployments, the access nodes 120 may be interconnected to each other by means of X2 or Xn interfaces, and connected to an Evolved Packet Core (EPC) by means of an S1 interface or to the 5GC by means of a NG interface.

The terminal nodes 110 are network elements in the network that terminate the user side of the radio link. They are devices allowing access to network services. The terminal nodes 110 may be referred to as User Equipment (UE), mobile terminals or mobile stations. The term ‘User Equipment’ may be used to designate mobile equipment comprising a smart card for authentication/encryption etc such as a subscriber identity module (SIM). In other examples, the term ‘User Equipment’ is used to designate mobile equipment comprising circuitry embedded as part of the user equipment for authentication/encryption such as software SIM.

The access nodes 120 are network elements in the network responsible for radio transmission and reception in one or more cells 122 to or from the terminal nodes 110. Such access nodes may also be referred to as a transmission reception points (TRP’s) or base stations. The access nodes 120 are the network termination of a radio link. An access node 120 can be implemented as a single network equipment, or disaggregated/distributed over two or more RAN nodes, such as a central unit (CU), a distributed unit (DU), a remote radio head-end (RRH), using different functional-split architectures and different interfaces.

In the following description, an access node will be referred to as gNB 120 and a terminal node 110 will be referred to as a UE 110.

UEs can perform a ‘power boost’ for its UL transmissions (not least for example in scenarios such as for certain TDD bands for pi/2 BPSK modulation or FDSS with spectrum extension utilizing QPSK). A Power Amplifier, PA, of a UE can be dimensioned such that it can provide a certain output power (e.g., 23 dBm) in a certain reference scenario, e.g., QPSK modulation and Discreet Fourier Transform Spread Orthogonal Frequency Division Multiplexing, DFT-S-OFDM.

Typically, UEs must reduce the Tx power for other scenarios (such as higher modulation orders and/or Cyclic Prefix OFDM, CP-OFDM). In these cases, the UE is allowed to operate with a certain Maximum Power Reduction, MPR, which ensures that a transmitted signal having a higher peak to average ratio (compared to the reference scenario—QPSK/DFT-S-OFDM) can meet various transmitter requirements (such as: Error Vector Magnitude, EVM; In-Band Emissions IBE; Adjacent Leakage Power Ratio, ACLR; and Occupied Channel Bandwidth, OCB). The allowed MPR may be defined by the specifications. Based on that, the logic behind a power boost is that when Peak-to-Average Power Ratio, PAPR, of the transmitted signal is reduced compared to a reference waveform (such as DFT-S-OFDM with QPSK) the UE can provide a higher Tx power accordingly (provided that SAR requirements can be met). The MPR values for the low-PAPR signal may be reduced accordingly. This may involve, depending on the scenario, also negative MPR values. The low PAPR waveform may support a new power class with a higher output power.

Power boost is supported for pi/2 BPSK (with FDSS). It may be defined also for QPSK with FDSS and with spectrum extension. It may also be defined, in principle, to any scheme reducing the PAPR compared to a reference waveform. Depending on the scenario, the MPR may be defined also by means of output backoff, or other metric. The same holds for PAPR. It may be defined e.g., by means of cubic metric.

As will be discussed below, examples of the present disclosure seek to address issues relating to how to determine a power boost for a UE. In other words, how to calculate a maximum allowable power boost, i.e., that is still within regulatory constraints with regards to maximum permissible transmission power. Various examples of the present disclosure seek to:

- define a relationship between transmission OFF time and a maximum allowed transmission,
- take into account previous transmissions with different Tx power levels, provide a balance between past transmissions and future transmissions, such that a next/upcoming transmission does not consume an entire available power boost budget.

In this disclosure, references to power and energy may refer to (potentially estimated) absorbed power/energy (e.g., Specific Absorption Rate, SAR) or (potentially estimated) equivalent isotropic radiated power/energy power, which may take spatial directivity into account (e.g., Effective isotropic radiated power, EIRP). EIRP and SAR can be used interchangeably and are related via the electric field at any spatial point as:

$$SAR = \frac{\sigma|E|^2}{\rho}$$

where: σ is conductivity of tissue (S/m)

ρ is mass density of tissue (kg/m$^3$)

E is root mean squared, RMS, electric field strength in tissue (V/m)

Under TS 38.101-1, v.17.1.0, 6.2.4 Configured transmitted power, a UE is able to apply a power boost based on whether 40% or less symbols are used/transmitted in a certain evaluation period (such an evaluation period not being less than one radio frame). In particular, the specification allows a UE to set its configured maximum output power $P_{CMAX,f,c}$ for carrier f of serving cell c in each slot. Under certain conditions, not least including where the UE is a power class 3 capable UE operating in TDD bands n40, n41, n77, n78, and n79 with pi/2 BPSK modulation, the UE can increase its transmission power based in part on whether 40% or less symbols are used for UL transmission in the evaluation period.

The Indian cellular standard association, Telecommunications Standards Development Society India, TSDSI, has proposed similar pi/2 BPSK power boosting based on whether 40% or less slots in a radio frame are used for UL transmission.

However, in their evaluation as to whether to allow a power boost, such conventional power boosting schemes utilize just Tx time (e.g., UE UL Tx using 40% or less symbols in an evaluation period, or UE UL Tx using 40% or less slots in a radio frame). The used relative Tx time is commonly called the Tx duty cycle. In effect, conventional power boosting schemes merely utilizes a UE's UL Tx duty cycle. By contrast, as will be discussed below, in examples of power boosting schemes according to the present disclosure, Tx power is used in addition to Tx time in evaluating whether to allow a power boost and also with regards to quantifying how much power boost is permitted (whilst still remaining within regulatory limits). By using both Tx time as well as Tx power, examples of the present disclosure are able to more accurately determine an actual amount of energy that has been transmitted and take this into consideration with regards to the determination of an available amount of transmission energy budget remaining, from which an allowable power boost can be determined. Examples of the disclosure can accommodate scenarios where a duty cycle is high but the transmitted power is low (on average) and a power boost can be applied. For example, when the Tx bandwidth is varied while keeping the transmitted power spectral density constant, the transmit power scales linearly according to the transmit bandwidth. This may vary from transmission to transmission. For example, transmitting Physical Uplink Control Channel, PUCCH, the UE may use only a narrow bandwidth (e.g., 1 Physical Resource Block, PRB, only) whereas, transmitting Physical Uplink Shared Channel, PUSCH, the number of PRBs may vary according to gNB scheduling decisions. In NR, the number of PRBs for PUSCH, transmitted via one bandwidth part can vary between 1 and 275.

Furthermore, in conventional power boosting schemes, power boosting is realized via RF-capability, depending on duty cycle constraints. For example, a UE that is limited to be scheduled less than 50% of the time can be configured to use power boosting that sets the max Tx power 3 dB higher. This is not dynamic and requires RRC reconfiguration (>100 ms). By contrast, in examples of the present disclosure, more dynamic power boosting can be achieved, for example where the Tx power can be adapted on a pre symbol basis (e.g., 0.125 ms).

Yet moreover, when moving away from conventional power boosting, the predictability of the UE Tx power may become an issue. At least some of the examples of the present disclosure are based on shared knowledge between the UE and the network. Coupled with the used deterministic algorithms, this can make the power boost predictable (which avoids rendering obsolete the channel estimation and demodulation functionality of NR).

In examples of the present disclosure, an instantaneous power boost, i.e., a maximum Tx power, for a UE is calculated based on the total amount of energy that has already been transmitted by the UE in a predefined time window. In some examples, an instantaneous power boost for a UE is calculated based on the total amount of energy that has been transmitted in a predefined time window (and/or that has been allocated for transmission(s) by the UE in a predefined time window).

FIG. 2 schematically illustrates an example of a method 200 according to the present discourse.

The blocks of FIG. 2 are functional and the functions therein, as well as the functions described below, can be performed by a single physical entity (such as an apparatus 10 as described with reference to FIG. 10). The functions of the blocks illustrated in FIG. 2, as well as the functions described below, can represent sections of instructions/code in a computer program (such as a computer program 14 as described with reference to FIG. 11). It will be understood that each block and combinations of blocks, can be implemented by various means, such as hardware, firmware, and/or software including one or more computer program instructions. For example, one or more of the procedures described below can be embodied by computer program instructions. In this regard, the computer program instructions which embody the procedures described above can be stored by a memory storage device and performed by a processor.

In block 201, a determination is made as to a first total amount of energy, $E_{Tx(TW1)}$, that has been transmitted by a UE within a first time window, TW1.

In block 202, a determination is made as to a first transmission power, $P_{maxTx(i)}$, that is allowed for a transmission, $TX_{(i)}$, by the UE within the first time window, TW1, wherein the first transmission power, $P_{maxTx(i)}$, is determined based, at least in part, on the first total amount of energy, $E_{Tx(TW1)}$, that has been transmitted by the UE within the first time window, TW1.

A duration/length of time of the first time window, TW1, may be defined in any appropriate manner—for example, in terms of: frame, subframe, slots, milliseconds, or symbols, etc. In some examples, the size of the first time window is predetermined by the network, for example it the size may be specified by a standard and hard coded. In some examples, the size of the window may be configured and/or dynamically or semi-statically adjusted, with the window size being signalled by a gNB to a UE via appropriate signalling.

In some examples, the first time window is defined as N consecutive slots. In some examples, the first time window defines an evaluation period. In some examples, the length of the first time window is equal to or greater than the length of a radio frame—10 ms. In some examples, the first time window may extend, from the present/a current point in time, into the past (i.e., such that the time window comprises N−1 slots in the past and a current, instantaneous slot, referred to as an $i^{th}$ slot, for which a first transmission power, $P_{maxTx(i)}$, is to be determined). In some examples, the first time window may cover: past slots, a current instantaneous slot, and also future slots (i.e. the first time window may comprise N−1-M slots in the past, a current $i^{th}$ slot [for which a first transmission power, $P_{maxTx(i)}$, is to be determined] and M slots in the future).

In some examples of the disclosure, there is provided a Radio Access Network, RAN, node, e.g., gNB, comprising means for configuring the UE for to perform the above-described energy-based power boost. The configuration of the UE by the RAN node may be based on the RAN node receiving UE capability information indicating that the UE supports energy-based power boost.

In some examples, the location of the first time window is absolute (e.g., its location is defined with respect to a particular radio frame). In some examples, the location of the first time window is relative (e.g., its location is defined with respect to a current slot, such as the $i^{th}$ slot as shown in FIG. 3).

Figure 3:
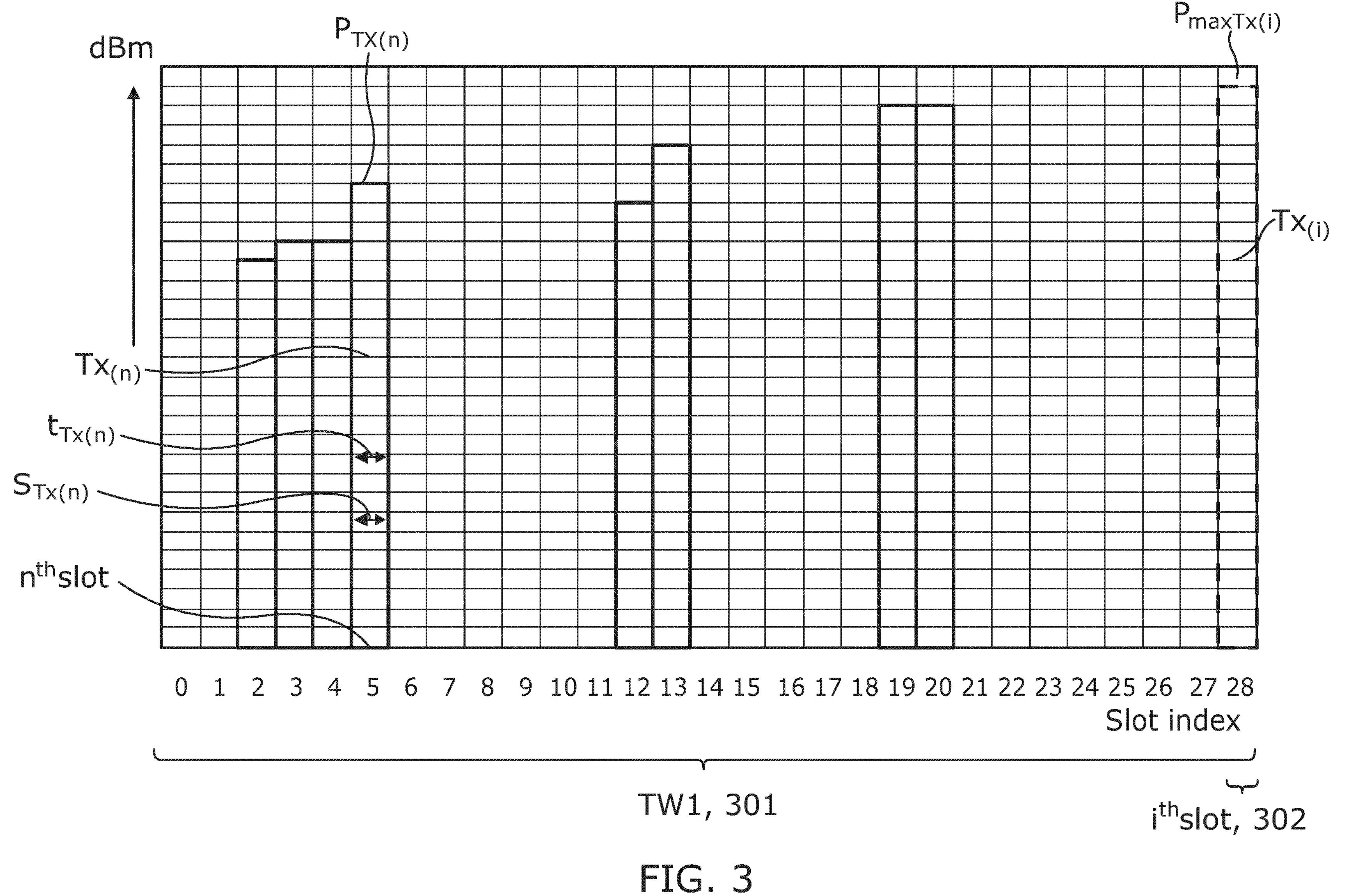
FIG. 3 shows another example of the subject matter described herein.

FIG. 3 schematically illustrates an example of a plurality of transmissions, $Tx_{(n)}$, from a UE over a first time window/evaluation period 301. Each transmission Tx(n) has a transmission duration $t_{Tx(n)}$ (in this case the transmission duration is 1 slot=1 ms, however other transmissions durations are possible) in which a number of symbols $s_{Tx(n)}$ are transmitted (for example up to 14 Orthogonal Frequency Division Multiplexing, OFDM, symbols).

In this particular example, the time window consists of 29 slots, with slot indexes: #0 to 28, wherein slot 28 constitutes the current/instantaneous slot, referred to as the $i^{th}$ slot 302. Accordingly, slot indexes #0-28 relate to slots that have occurred in the past, and transmissions $Tx_{(n)}$ in slot indexes #0-28 relate to transmissions that have been transmitted, with transmission $Tx_{(i)}$ for the current/instantaneous slot i, yet to have been transmitted. Various examples of the disclosure seek to determine a first transmission power, $P_{maxTx(i)}$, for the $i^{th}$ current/instantaneous slot.

As shown in this example, the transmission powers $P_{Tx(n)}$ for the transmissions $Tx_{(n)}$ vary between the differing slots (i.e., there are varying transmission powers, $P_{Tx(n)}$, for transmissions, $Tx_{(n)}$, of durations, $t_{Tx(n)}$, for slots, n). In the particular example shown, UE UL transmissions take place only during 8 of the 29 slots.

In some examples, the first total amount of energy, $E_{Tx(TW1)}$, that has been, or is to be, transmitted by the UE within the first time window, TW1, is determined based, at least in part, on:

- a second transmission power, $P_{Tx(n)}$, and a transmission duration, $t_{Tx(n)}$, of at least one transmission, $Tx_{(n)}$, transmitted by the UE within the first time window, TW1.

In some examples, a determination is made as to the transmission duration, $t_{Tx(n)}$, of the at least one transmission, $T_{x(n)}$, based on a number of symbols, $s_{Tx(n)}$, transmitted in the at least one transmission, $T_{x(n)}$.

In some examples, the first total amount of energy, $E_{Tx(TW1)}$, that has been, or is to be, transmitted by the UE within the first time window, TW1, is determined based, at least in part, on:

- a second transmission power, $P_{Tx(n)}$, and a transmission duration, $t_{Tx(n)}$, of each of the transmissions, $Tx_{(n)}$, that have been transmitted by the UE so far (i.e., all of the transmissions that have been transmitted up to the present time/the $i^{th}$ slot) within the first time window, TW1.

In some examples, the first total amount of energy, $E_{Tx(TW1)}$, that has been transmitted by the UE within the first time window, TW1, (i.e., the amount of energy that has been consumed/used up) is determined as the sum of the transmitted energy over all the transmitted symbols within the first time window (i.e., all of the symbols that have been transmitted thus far, i.e., up to the slot of interest—the $i^{th}$ slot—for which the instantaneous power boost is being determined). In other words, the first total amount of energy, $E_{Tx(TW1)}$, corresponds to the sum of the transmitted energy over all the transmitted symbols within the first time window except the symbols of the $i^{th}$ transmission $Tx_{(i)}$ of the $i^{th}$ slot. This can be illustrated also as the integral of the transmitted power within the first time window.

In some examples, the first total amount of energy, $E_{Tx(TW1)}$, is calculated based on a maximum (nominal) power, e.g., 21 dBm (rather than the actual Tx power for the slot).

In some examples, the first total amount of energy, $E_{Tx(TW1)}$, is calculated based on a number of UL slots/symbols in a TDD configuration (i.e., according to a worst case scenario).

In some examples, the first total amount of energy, $E_{Tx(TW1)}$, that has been transmitted by the UE within the first time window (i.e., excluding the $i^{th}$ slot) is calculated as:

$$E_{Tx(TW1)} = \sum_{n=1}^{N-1} (P_{Tx(i-n)} s_{Tx(i-n)})$$

where: $P_{Txn}$=Tx power for slot n (Watts)

$s_{Txn}$=number of symbols used for/transmitted in slot n

In other examples, another approach is adopted to calculate the first total amount of energy, $E_{Tx(TW1)}$, that has been transmitted by the UE within the first time window, namely based on an Infinite Impulse Response, IIR, filter. The first total amount of energy, that has been transmitted by the UE within the first time window until the $i^{th}$ slot is iteratively calculated as:

$$E_{Tx(TW1)}(i) = (1-a)E_{Tx(TW1)}(i-2) + (aP_{Tx(i-1)} t_{Tx(i-1)})$$

where: a defines a IIR window (=a decay coefficient or forgetting factor)

$P_{Tx(i-1)}$=Tx power for slot (i−1) (in Watts)

$t_{Tx(i-1)}$=transmission duration for slot (i−1), which can be expressed in the number of symbols used for slot (i−1)

In some examples, the first transmission power, $P_{maxTx(i)}$, is further determined based, at least in part, on an allowed transmission energy, $E_{allowedTx(TW1)}$, wherein the allowed transmission energy, $E_{allowedTx(TW1)}$, is indicative of a maximum second total amount of energy permitted to be transmitted by the UE over course of the first time window. This may be determined, for example, in terms of WattSym(bol) or WattS(econd), or any other suitable unit of power. It is possible to use other known units for the energy, such as Joule or kHw. The allowed transmission energy, $E_{allowedTx(TW1)}$, may be dependent, at least in part, on regulatory limits/restrictions constraints based on SAR, EIRP requirements etc.

In some examples, allowed transmission energy, $E_{allowedTx(TW1)}$, for the entire first time window is calculated based on an assumed contiguous UL transmission, at a particular nominal power, for the duration of the time window. For example, a contiguous UL transmission of 14 symbols per slot for all the slots of the first time window at a nominal power. The nominal power may be based on a power class, $P_{PowerClass}$, of the UE. For example:

$$E_{allowedTx(TW1),} = 0.125 \times 14 \times N \ (Wsym)$$

where: in this particular example, the nominal power=21 dBm=0.125 W

N=number of slots on the first time window.

In some examples, the first transmission power, $P_{maxTx(i)}$, is further determined based, at least in part, on:

a first available transmission energy, $E_{available(i)}$, for the transmission, $Tx_{(i)}$, wherein the first available transmission energy, $E_{available(i)}$, for the transmission, $TX_{(i)}$, is determined, based at least in part, on a difference between:

the allowed transmission energy, $E_{allowedTx(TW1)}$, and the first total amount of energy, $E_{Tx(TW1)}$, that has been transmitted by the UE within the first time window, TW1.

In some examples, the first available transmission energy, $E_{available(i)}$, for the transmission, $TX_{(i)}$, is calculated as:

$$E_{available(i)} = E_{allowedTx(TW1)} - E_{Tx(TW1)}$$

In some examples, the first available transmission energy, $E_{available(i)}$, for the transmission, $Tx_{(i)}$, is adjusted by a first parameter value, X, where: X can be equal to N (the total number of slots in the first time window) or a parameter value smaller or larger than N. The first parameter value can be either signalled to the UE or it can be predefined. The first parameter value, X, can be used to share the available power boosting budget in time. In this regard, the first parameter value may enable an adjustment of the how first available transmission energy, $E_{available(i)}$, is apportioned out, e.g., so as to share the available energy in time. The first available transmission energy, $E_{available(i)}$, for the transmission, $Tx_{(i)}$, is calculated as:

$$E_{available(i)} = (E_{allowedTx(TW1)} - E_{Tx(TW1)})/X$$

where: X can be equal to N (the total number of slots in the first time window) or a parameter value smaller or larger than N.

In some examples, the first transmission power, $P_{maxTx(i)}$, is further determined based, at least in part, on:

a third transmission power, $P_{available(i)}$, wherein the third transmission power, $P_{available(i)}$, is indicative of a transmission power that is available for the UE for the transmission, $TX_{(i)}$, wherein the third transmission power, $P_{available(i)}$, is determined based, at least in part, on:

the first available transmission energy, $E_{available(i)}$; and a duration of the transmission $Tx_{(i)}$, or a number of symbols in the transmission $Tx_{(i)}$.

In some examples, the third transmission power, $P_{available(i)}$, for the transmission, $Tx_{(i)}$, can be calculated as:

$$P_{available(i)} = E_{available(i)}/t_{Tx(i)}$$

where: $t_{Tx(i)}$=duration of the $i^{th}$ transmission $Tx_{(i)}$ (in some examples, $t_{Tx(i)}$ can be defined based on the number of symbols, $s_{Tx(i)}$, to be transmitted in the $i^{th}$ slot—i.e., number of symbols in the $i^{th}$ transmission, $Tx_{(i)}$).

In some examples, the third transmission power, $P_{available(i)}$, for transmitting each symbol of the transmission, $Tx_{(i)}$, can be calculated as:

$$P_{available(i)} = E_{available(i)} / S_{Tx(i)}$$

where: $s_{Tx(i)}$=number of symbols transmitted in the $i^{th}$ slot (i.e., the number of symbols to be transmitted in the $i^{th}$ transmission, $Tx_{(i)}$)

wherein the third transmission power, $P_{available(i)}$, is determined based, at least in part, on:

the first available transmission energy, $E_{available(i)}$, and a duration of the transmission $TX_{(i)}$ (or a number of symbols. $s_{Tx(i)}$, of the transmission $Tx_{(i)}$).

Based on the third transmission power, $P_{available(i)}$, for the transmission, $Tx_{(i)}$, the first transmission power, $P_{maxTx(i)}$, that is allowed for the transmission, $Tx_{(i)}$, by the UE within the first time window can be calculated taking into account the maximum power based on the regulatory constraints (e.g., 26 dBm).

In some examples, the first transmission power, $P_{maxTx(i)}$, that is allowed for the transmission, $Tx_{(i)}$, by the UE within the first time window is calculated as:

as a minimum of:

the third transmission power, $P_{available(i)}$, and a fourth transmission power, $P_{regulated}$, wherein the fourth transmission power is indicative of a predetermined maximum transmission power that is permitted for the UE.

In some examples, the first transmission power, $P_{maxTx(i)}$, that is allowed for the transmission, $Tx_{(i)}$, by the UE within the first time window is defined as:

$$P_{maxTx(i)} = \min(P_{available(i)}, P_{regulated})$$

In some examples, the fourth transmission power, $P_{regulated}$, is stipulated by regulatory limits/constraints, i.e., with regards to maximum safe levels of energy/power that can be transmitted (e.g., based on SAR and/or EIRP) as to be indicative of a predetermined maximum transmission power that is permitted for the UE. In some examples, the fourth transmission power is pre-determined (e.g., predefined in the specification). In other examples, the UE is configured with the fourth transmission power, i.e., the UE receives the fourth transmission (e.g., via higher layer signaling).

In some examples, the UE's transmission power is controlled based at least in part on the first transmission power, $P_{maxTx(i)}$.

In some examples, the first transmission power, $P_{maxTx(i)}$, is used to adjust one or more transmission power parameters for controlling the transmission power of the UE. For example, the first transmission power, $P_{maxTx(i)}$, may be used for updating: $P_{EMAX,c}$, $\Delta P_{PowerClass}$ and/or $P_{CMAX,f,c}$.

In some examples, an additional, second time window, TW2, is utilized. The second time window can be defined with respect to the first time window. For example, the location of the second time window can be absolute or relative with respect to the first time window. The second time window can have a predefined duration (e.g., 30%) of the first time window. The second time window can have a predefined energy budget, i.e., a predefined fourth total amount of energy, $E_{allowedTx(TW2)}$, (e.g., 50% of the second total amount of energy $E_{allowedTx(TW1)}$. The above-mentioned predefined parameters defining characteristics of the second time window (e.g., defining its length and available energy) can be predefined by being hard coded in the specification or being predefined and signaled to/from the gNB, e.g., via dedicated Radio Resource Control, RRC, signalling.

As will be discussed below, the use of such a second time window may allow to a trade-off between different power boost strategies. The second time window can be utilised to ensure that a (limited) power budget is left available/remains for upcoming transmissions, i.e., to save some of the power budget for future so that the power budget allotted to the next ($i^{th}$) slot will use up all of an available budget.

Figure 4:
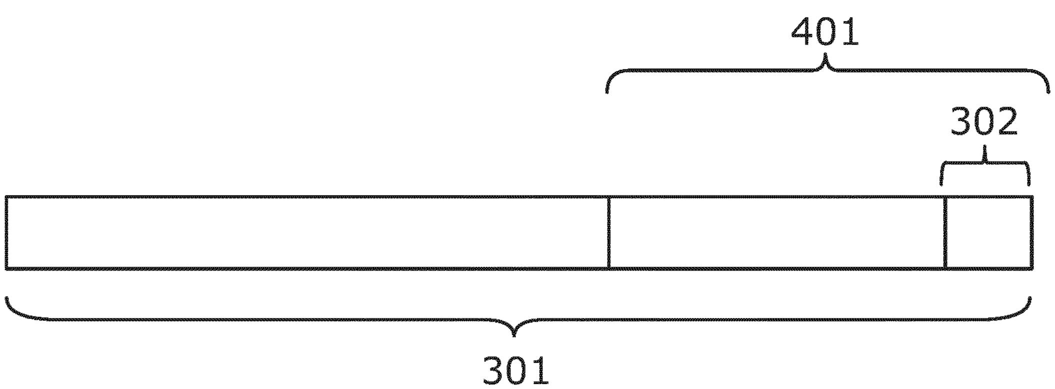
FIG. 4 shows another example of the subject matter described herein.

FIG. 4 schematically illustrates a first time window 301 comprising a sub-window, namely a second time window, TW2, 401. The $i^{th}$ slot 302 is within the second time window. The second time window, TW2, has a length that is less than the length of the first time window, TW1, by predefined amount or a configured amount. The UE could receive configuration information regarding the size of the first time window and/or the size of the second time window dynamically or semi-statically. Configuration information regarding the first time window and/or the second time window may be transmitted, via dedicated RRC signalling, e.g.:

BWP-UplinkDedicated,

PUSCH-Config,

PUSCH-PowerControl,

PUCCH-Config, and/or

PUCCH-PowerControl.

In some examples, the first transmission power, $P_{maxTx(i)}$, is further determined based, at least in part, on a third total amount of energy, $E_{Tx(TW2)}$, that has been transmitted (or, where the second time window is in the future, is to be transmitted) by the UE within the second time window, TW2.

In some examples, the third total amount of energy for the 2nd window (until the $i^{th}$ slot) may be iteratively calculated as:

$$E_{Tx(TW2)}(i) = \sum_{m=1}^{M-1} (P_{Tx(i-m)} - t_{Tx(i-m)})$$

where: M is the duration of the second time window (e.g., the number of slots).

In other examples, the third total amount of energy for the $2^{nd}$ window (until the $i^{th}$ slot) may be iteratively calculated as:

$$E_{Tx(TW2)}(i) = (1-b)E_{Tx(TW2)}(i-2) + (bP_{Tx(i-1)}t_{Tx(i-1)})$$

where: b which defines the IIR window (=decay coefficient or forgetting factor). In some examples, b is larger than the parameter a used for the first time window to make the second time window shorter than the first time window.

A fourth total amount of energy, $E_{allowedTx(TW2)}$, permitted to be transmitted by the UE over the second time window can be calculated or determined based on the second total amount of energy, $E_{allowedTx(TW1)}$, permitted to be transmitted by the UE over the first time window, TW1. For example, total amount of allowed energy, $E_{allowedTx(TW2)}$, can be defined as being smaller than the total amount of allowed energy, $E_{allowedTx(TW1)}$, by predefined amount or a configured amount. The UE could receive, dynamically or semi-statically, configuration information regarding the second time window's total amount of allowed energy, $E_{allowedTx(TW1)}$. Configuration information regarding for the second time window, via dedicated RRC signalling.

A second available transmission energy, $E_{available(i)TW2}$, for the transmission, $Tx_{(i)}$, can be determined, wherein the second available transmission energy, $E_{available(i)TW2}$, for the transmission, $Tx_{(i)}$, is indicative of a difference between:

the total amount of allowed energy, $E_{allowedTx(TW2)}$, permitted to be transmitted by the UE over the second time window, and the third total amount of energy, $E_{Tx(TW2)}$, that has been, or is to be, transmitted by the UE within the second time window, TW2 (such a third total amount of energy excluding the energy to be transmitted for the $i^{th}$ slot).

The second available transmission energy, $E_{available(i)TW2}$, for the transmission, $Tx_{(i)}$, can be calculated as:

$$E_{available(i)TW2} = (E_{allowedTx(TW2)} - E_{Tx(TW2)})$$

In some examples, the second available transmission energy, $E_{available(i)}$ TW2, for the transmission, $Tx_{(i)}$, is adjusted by a second parameter value, $X_2$, where: $X_2$ can be equal to M (the total number of slots in the second time window) or a parameter value smaller or larger than M. The second parameter value can be either signalled to the UE or it can be predefined. Similar to the first parameter value, the second parameter value, $X_2$, can be used to share the available power boosting budget in time. In this regard, the second parameter value may enable an adjustment of the how second available transmission energy, $E_{available(i)TW2}$, is apportioned out, e.g., so as to share the available energy in time. The second available transmission energy, $E_{available(i)TW2}$, for the transmission, $Tx_{(i)}$, can be calculated as:

$$E_{available(i)TW2} = (E_{allowedTx(TW2)} - E_{Tx(TW2)})/X_2$$

where: $X_2$ can be equal to M (the total number of slots in the second time window) or a parameter value smaller or larger than N.

In some examples, a third available transmission energy is determined, wherein the third available transmission energy is defined as the minimum of:

the first available transmission energy, $E_{available(i)}$, and the second available transmission energy, $E_{available(i)TW2}$.

When taking into account both the first and second time windows, and the respective first and second available transmission energies, the third available transmission energy, which represents a maximum available transmission energy for the $i^{th}$ slot is calculated as:

$$\min(E_{available(i)}, E_{available(i)TW2})$$

In the above-described examples, the transmissions Tx(n) and duration of the same have been described with regards to slots, i.e. transmissions and durations at the granularity of one slot (such that Tx power is assumed to be kept unchanged during the slot). However, it is to be appreciated that examples of the disclosure can be scaled to operate in any granularity, not least for example: one or more mini-slots or one or more OFDM symbols (for example such that each transmission Tx(n), and its duration, could be considered to be a transmission of an OFDM symbol). In some examples, the first and second time windows may be determined in milliseconds, or in OFDM symbols.

In some examples, the allowed transmission energies, $E_{allowedTx(TW1)}$ and $E_{allowedTx(TW2)}$ for the first and second time windows depend on a modulation order or modulation and coding scheme of the transmissions. For example, the allowed transmission energies may be available, not least for example, for pi/2 BPSK, or Quadrature Phase Shift Keying, QPSK or QPSK with spectrum extension.

In some examples, an allowed EIRP is used as a criterion (instead of allowed Tx power, i.e., the third transmission power, $P_{available(i)}$), wherein the allowed EIRP may be defined as the allowed Tx power, $P_{available(i)}$+antenna/beamforming gain.

Figure 5:
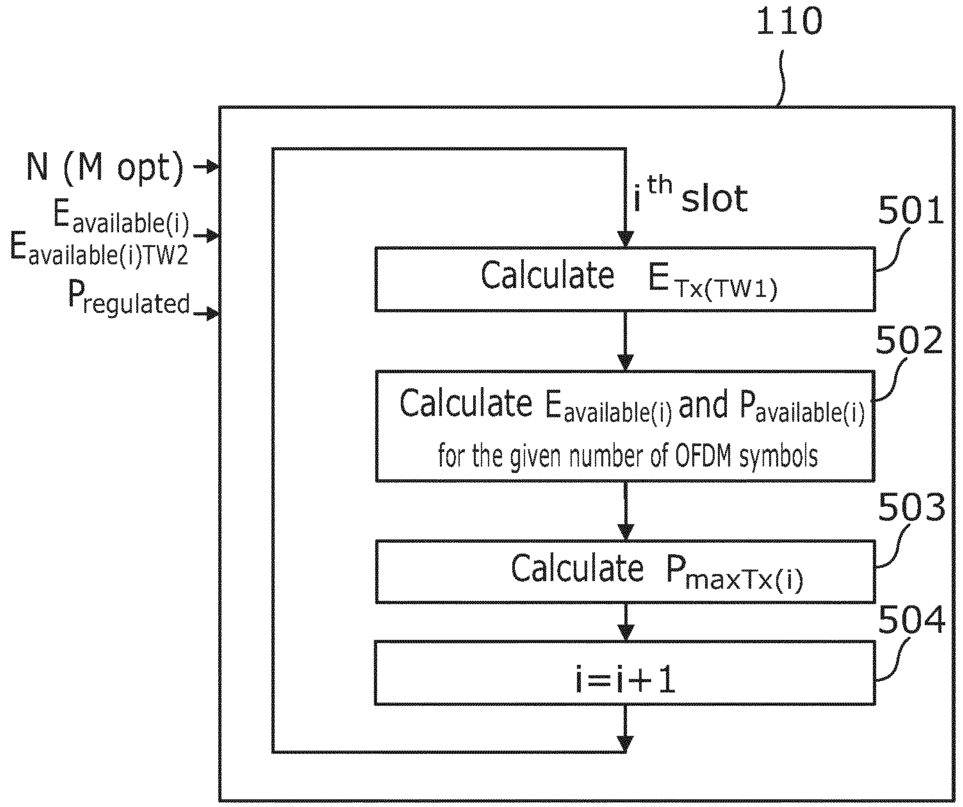
FIG. 5 shows another example of the subject matter described herein.

FIG. 5 shows a schematic UE block diagram of a UE 110 supporting the above-mentioned functionality, namely an iterative process by which to calculate an instantaneous power boost for a current, $i^{th}$, slot. The blocks illustrated in FIG. 5 can represent actions in a method and/or sections of instructions/code in a computer program (such as a computer program 14 as described with reference to FIG. 11).

The UE performs the following steps:

1. Semi-static input parameters may be received by the UE, including:
   - N which represents the number of slots of the first time window;
   - optionally, where a second time window is used, M which represents the number of slots of the second time window;
   - $E_{allowedTX(TW1)}$ which represents the maximum second total amount of energy permitted to be transmitted by the UE over the first time window; optionally, where a second time window is used, $E_{allowedTX(TW2)}$ which represents the maximum fourth total amount of energy permitted to be transmitted by the UE over the second time window;
   - $P_{regulated}$ which represents the predetermined maximum transmission power that is permitted for the UE.

Allowed energy for the first time window $E_{Tx(TW1)}$ (or $E_{available(i)}$) is calculated based on UL transmission assuming a nominal transmission power as indicated in block 501. Allowed energy of the next slot, i.e., the $i^{th}$ slot, based on the second time window is calculated via $E_{allowedTx(TW2)}-E_{Tx(TW2)}$, where $E_{allowedTx(TW2)}$ represents a predefined energy budget for the second time window, and $E_{Tx(TW2)}$ represents consumed energy for the second time window.
2. Using the semi-static inputs, $E_{Tx(TW1)}$ until $i^{th}$ slot (excluding $i^{th}$ slot) and $P_{avaliable(i)}$ for a given number of OFDM symbols for the $i^{th}$ slot can be calculated, as indicated in block 502.
3. $P_{maxTx(i)}$ is determined based on $P_{maxTx(i)}$=min ($P_{available(i)}$, $P_{regulated}$), as indicated in block 503. $P_{maxTx(i)}$ can be used then to update $P_{CMAX,f,c(i)}$ in the UL power control formula.
4. The instantaneous power boost integrative calculation process continues by increasing the slot (if there is any) and goes back to step 1, as indicated in block 504.

Figure 6:
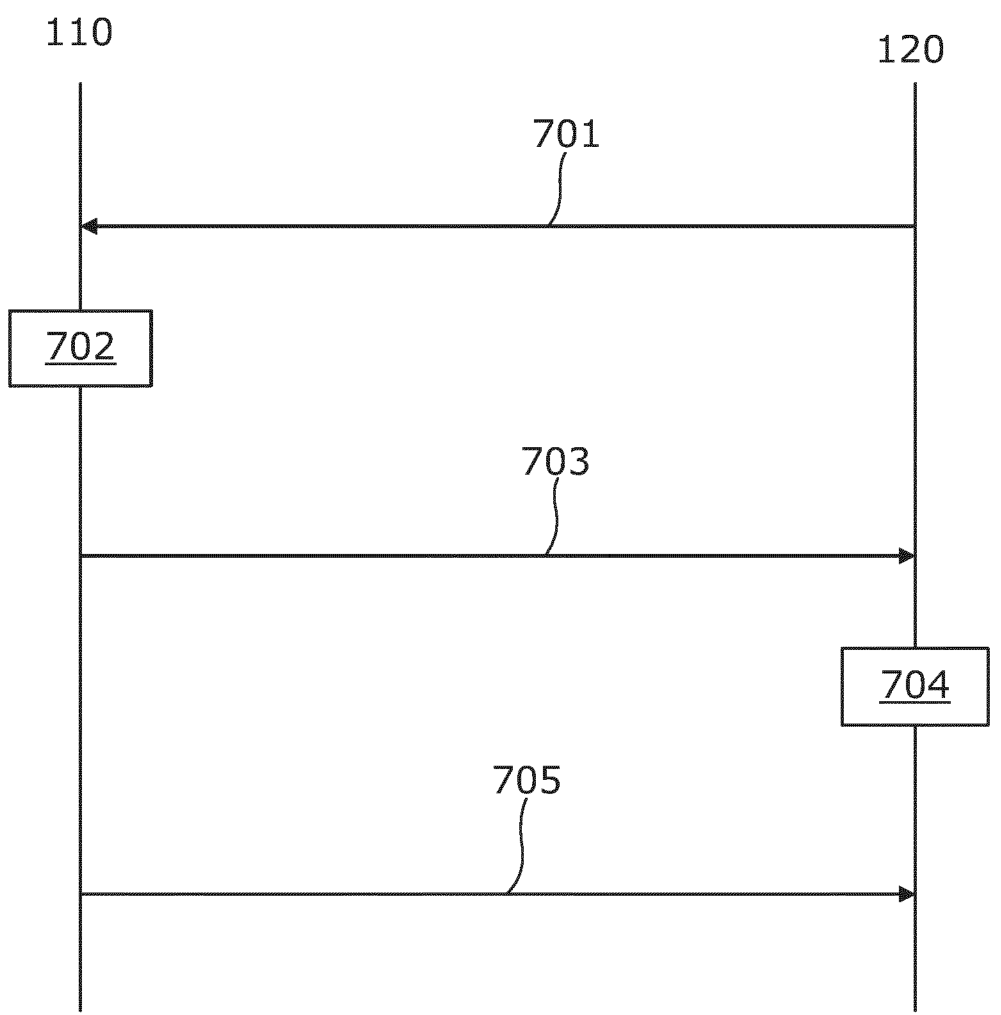
FIG. 6 shows another example of the subject matter described herein.

FIG. 6 is a signalling diagram, showing signalling between a UE 110 and a gNB 120. Such signalling between the UE 110 and gNB 120 may be used, for example, for the UE to:

request to alter its maximum duty cycle;

convey information for defining the length and temporal location of the first time window, TW1;

convey the first total amount of energy, $E_{Tx(TW1)}$, that has been transmitted by the UE within the first time window, TW1; and convey the first transmission power, $P_{maxTx(i)}$.

In some examples, in message 701, the gNB 120 sends duty cycle related parameters to the UE 110. The duty cycle parameters comprise a set of numbers that describe all variables in a chosen transmit power calculation scheme that are not known at the UE 110 (e.g., not hardcoded or dependent on scheduling or design choices at the gNB 120). The duty cycle parameters may comprise, not least for example:

a length of the first time window and, optionally, a length of the second time window;

an indication of allow energy, which may be expressed in terms of N and M;

a fundamental power class;

configuration parameters that decide what time basis is used (e.g., slots, symbols, etc);

an absolute maximum transmit power that might not be broken even with boosting (RF imperfections make this necessary);

values of the above discussed parameters: "X", "$X_2$", "a" and "b".

The UE 110 may use such parameters to (predictably) calculate the transmission power in slot i.

In other examples, in message 701, the gNB 120 sends configuration parameters for duty cycle related signalling (such as which resources to use, triggering related parameters, content related parameters—in summary how to report and what to report).

In block 702, the UE 110 calculates an instantaneous power boost, $P_{maxTx(i)}$, based on the observed duty cycle. The observed duty cycle may correspond to a transmit symbol allocation observed by the UE 110 to have happened in the past, i.e., within the time window(s), and "observed"/predicted to be happing in the future. This could be based, for example on BSR. The observed duty cycle could cover also signalling for the $E_{Tx(TW1)}$.

In message 703, the UE 110 sends a duty cycle report to the gNB 120. Responsive to receipt of the duty cycle report, the gNB 120 schedules a lower duty cycle and/or a higher data rate. In some examples, in message 703, the UE 110 sends a duty cycle request to the gNB 120, i.e., to request that the UE's duty cycle be adjusted.

In message 704, the gNB 120 sends scheduling information to the UE 110. In some examples, the gNB 120 sends standard NR scheduling indications, i.e., it just tells the UE 110 when it has the next UL possibility. In other examples, the gNB 120 sends an extension of the standard NR scheduling indications, i.e., it tells the UE 110 how the UE will be scheduled next and in the farther future. In such a manner, the gNB 120 discloses its internal scheduling planning to allow improved UL power boosting prediction at the UE 110.

In some examples, the UE signals, to an access node, one or more of:

a request to alter a maximum duty cycle for the UE;

information for defining the length and temporal location of the first time window, TW1;

the first total amount of energy, $E_{Tx(TW1)}$, that has been transmitted by the UE within the first time window, TW1; and the first transmission power, $P_{maxTx(i)}$.

Such signalling provides a mechanism by which the UE can indicate, more dynamically than conventionally possible, a need for a limited/reduced duty cycle (for example in a scenario when the UE is at a cell edge and operates at high/maximum duty cycle, i.e., close to maximum power or at maximum power, such that the UE is unable to perform an instantaneous power boost to seek to increase coverage).

The above signalling provides a mechanism by which more dynamic signalling could be introduced for UE to request limited/reduced duty cycle and/or to adjust the periodicity of granted transmissions. This may not be needed for access with configured grants because configured grants already have periodic allocation, however many services use granted access and hence coverage of the same could be improved by introducing limited duty cycle.

The signalling could be such that UE requests e.g., limited duty cycle and possibly also some periodicity for the transmissions. Periodicity could also be included since the UE would use a certain time window (e.g., the first time window and/or the second time window) for its instantaneous power boosting and hence the periodicity should match the time window, i.e., be the same or shorter as time window' size.

In some examples, different maximum power settings could be used for different traffic classes, i.e., boosted power could be used for traffic requiring high reliability and lower power for other type of traffic. This would require, e.g., signalling of traffic specific p-Max ($P_{EMAX,c}$ in 38.101).

The duty cycle report signalling could be added e.g., to:

Power Headroom Report (PHR),

Buffer Status Report (BSR),

New Radio Resource Control (RRC) message,

New Medium Access Control (MAC) message, and/or

New Layer 1 (L1) message (similar to Channel State Information (CSI) report).

Existing conventional duty cycle signalling uses enumerations with either 5 or 11 members, i.e., requiring 3 or 4 bits. In some examples, something similar could be used also for maximum duty cycle report. If the UE is close to maximum power less than 50% duty cycle is needed for 3 dB power boost. In this sense, especially when dynamic signalling is used, very low granularity of signalling could be used, even 1-2 bits.

Figure 7:
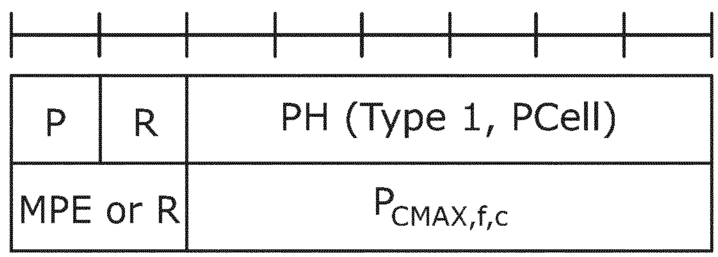
FIG. 7 shows another example of the subject matter described herein.

A Power Headroom Report. PHR, structure may be used for signalling a maximum duty cycle request. PHR is transmitted in single or multiple entry PHR MAC CE. Single entry option is shown in FIG. 7. One option for extra bits for signalling are reserved (R) bits. There is one R bit and three R bits, if MPE (Maximum Permissible Exposure) is not used. MPE is a feature where the UE can report MPR (Maximum Power Reduction) used in order to be compliant with the exposure requirements. The feature is preferable for FR2. Another alternative would be to reduce granularity of PHR or Pcmax. Since operation is expected to be close to maximum power, the full dynamic range for these is not needed. Extension to multiple entry is similar to single entry.

Buffer Status Report, BSR, could also be used for signalling. It would have the benefit to be able to signal different value for each Logical Channel Group (LCG). This could facilitate requesting different maximum duty cycles for different traffic type/priorities. MAC CEs for BSR are shown in FIGS. 8 and 9. Bits for duty cycle request could be taken by reducing the buffer size field of FIG. 8 or 9.

Another signalling related enhancement could be reporting some other parameter (for instance the first time window energy $E_{Tx(TW1)}$) e.g., as part of PHR. Based on this, the gNB would know how close to maximum power the UE is operating and the gNB can then adapt the UL scheduling accordingly, e.g., lower the duty cycle to better facilitate power boosting, or schedule a high data rate knowing that UE has opportunities for power boost.

PHR can also be used even in legacy form to estimate how close to maximum power the UE is, however the information is not very specific and hence additional information could be obtained via the above proposed enhancements.

It is to be appreciated that the exact method to calculate the instantaneous power boost needs to be known to the network (and standardized) to allow for operation in the standard NR framework, at least with respect to channel estimation and demodulation, and to allow for effective scheduling of the UE on the network side (e.g., for improved coverage). Based on an amount of data in buffer to be transmitted, different strategies for power boosting can be applied to calculate/estimate the burst duration at the UE. In some examples, the UE only uses buffer information that is shared with the network via buffer status reports and power headroom reports, to maintain predictability of boosting.

In some examples, the UE determines traffic information for data to be transmitted; and controls the UE's transmission power for transmitting the data based, at least in part, on the traffic information. The traffic information may be indicative as to type or priority level/class of traffic that is to be transmitted, such as related to the data's required: quality of service class, network slice i.e., Network Slice Selection Assistance Information (NSSAI), latency and/or reliability.

Various examples of the present disclosure may provide one or more of the following advantages:

- allows a larger transmission power boost for a UE without violating SAR regulations;
- improved UL coverage;
- facilitates dynamic power boost allowance in a controlled, i.e., predictable, way;
- allows to trade-off transmission power between a next transmission and future transmissions;
- allows to re-use transmission power from past transmissions in a next transmission;
- computational complexity is reasonable (calculations can be facilitated also by simple IIR filter(s));
- allows dynamic duty cycle adaptation; and
- allows to get rid of numerical duty cycle definitions/restrictions (instead examples of the disclosure introduce energy-based definitions which can be operated without pre-defined duty cycle limits).

Various, but not necessarily all, examples of the present disclosure can take the form of an apparatus, a method or a computer program. Accordingly, various, but not necessarily all, examples can be implemented in hardware, software or a combination of hardware and software.

Various, but not necessarily all, examples of the present disclosure are described using flowchart illustrations and schematic block diagrams. It will be understood that each block (of the flowchart illustrations and block diagrams), and combinations of blocks, can be implemented by computer program instructions of a computer program. These program instructions can be provided to one or more processor(s), processing circuitry or controller(s) such that the instructions which execute on the same create means for causing implementing the functions specified in the block or blocks, i.e., such that the method can be computer implemented. The computer program instructions can be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Various, but not necessarily all, examples of the present disclosure provide both a method and corresponding apparatus comprising various modules, means or circuitry that provide the functionality for performing/applying the actions of the method. The modules, means or circuitry can be implemented as hardware, or can be implemented as software or firmware to be performed by a computer processor. In the case of firmware or software, examples of the present disclosure can be provided as a computer program product including a computer readable storage structure embodying computer program instructions (i.e., the software or firmware) thereon for performing by the computer processor.

Figures 8, 9, 10, 11:
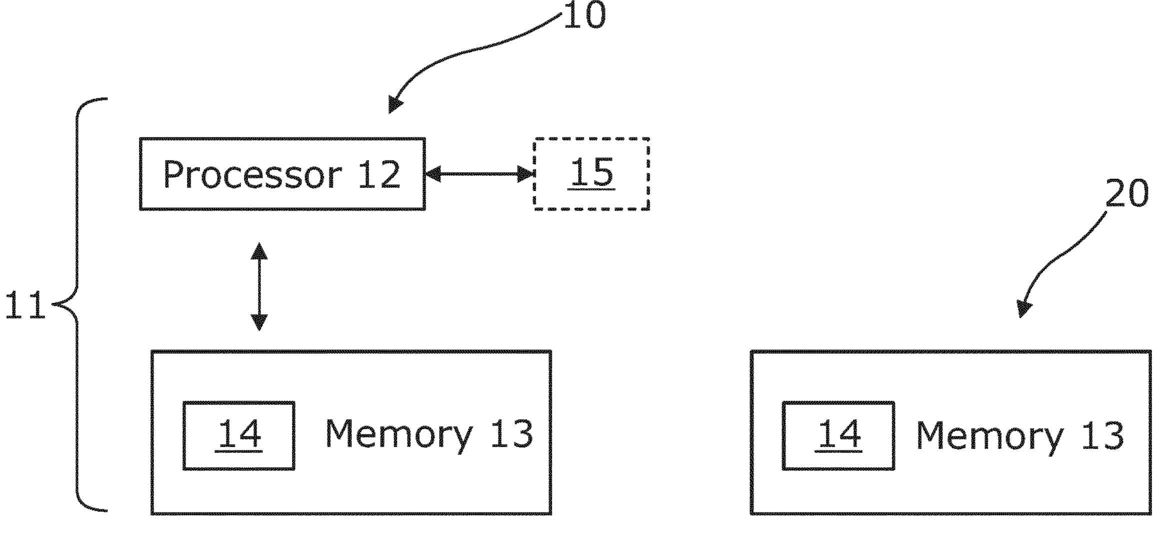
FIG. 8 shows another example of the subject matter described herein.
FIG. 9 shows another example of the subject matter described herein.
FIG. 10 shows another example of the subject matter described herein.
FIG. 11 shows another example of the subject matter described herein.

FIG. 10 schematically illustrates a block diagram of an apparatus 10 for performing the methods, processes, procedures and signalling described in the present disclosure and not least those illustrated in FIGS. 2, 5 and 6. In this regard the apparatus 10 can perform the roles of a UE 110 (or, where appropriate, not least such as with regards to the signalling of FIG. 6, a RAN node 120). The component blocks of FIG. 10 are functional and the functions described can be performed by a single physical entity.

The apparatus comprises a controller 11, which could be provided within a device such as a UE 110.

The controller 11 can be embodied by a computing device, not least such as those mentioned above. In some, but not necessarily all examples, the apparatus can be embodied as a chip, chip set or module, i.e., for use in any of the foregoing. As used here 'module' refers to a unit or apparatus that excludes certain parts/components that would be added by an end manufacturer or a user.

Implementation of the controller 11 can be as controller circuitry. The controller 11 can be implemented in hardware alone, have certain aspects in software including firmware alone or can be a combination of hardware and software (including firmware).

The controller 11 can be implemented using instructions that enable hardware functionality, for example, by using executable instructions of a computer program 14 in a general-purpose or special-purpose processor 12 that can be stored on a computer readable storage medium 13, for example memory, or disk etc, to be executed by such a processor 12.

The processor 12 is configured to read from and write to the memory 13. The processor 12 can also comprise an output interface via which data and/or commands are output by the processor 12 and an input interface via which data and/or commands are input to the processor 12. The apparatus can be coupled to or comprise one or more other components 15 (not least for example: a radio transceiver, sensors, input/output user interface elements and/or other modules/devices/components for inputting and outputting data/commands).

The memory 13 stores a computer program 14 comprising computer program instructions (computer program code) that controls the operation of the apparatus 10 when loaded into the processor 12. The computer program instructions, of the computer program 14, provide the logic and routines that enables the apparatus to perform the methods, processes and procedures described in the present disclosure and not least as illustrated in FIGS. 2, 5 and 6. The processor 12 by reading the memory 13 is able to load and execute the computer program 14.

Although the memory 13 is illustrated as a single component/circuitry it can be implemented as one or more separate components/circuitry some or all of which can be integrated/removable and/or can provide permanent/semi-permanent/dynamic/cached storage.

Although the processor 12 is illustrated as a single component/circuitry it can be implemented as one or more separate components/circuitry some or all of which can be integrated/removable. The processor 12 can be a single core or multi-core processor.

The apparatus can include one or more components for effecting the methods, processes and procedures described in the present disclosure and not least as illustrated in FIGS. 2, 5 and 6. It is contemplated that the functions of these components can be combined in one or more components or performed by other components of equivalent functionality. The description of a function should additionally be considered to also disclose any means suitable for performing that function. Where a structural feature has been described, it can be replaced by means for performing one or more of the functions of the structural feature whether that function or those functions are explicitly or implicitly described.

Although examples of the apparatus have been described above in terms of comprising various components, it should be understood that the components can be embodied as or otherwise controlled by a corresponding controller or circuitry such as one or more processing elements or processors of the apparatus. In this regard, each of the components described above can be one or more of any device, means or circuitry embodied in hardware, software or a combination of hardware and software that is configured to perform the corresponding functions of the respective components as described above.

The apparatus can, for example, be a client device, a server device, a mobile cellular telephone, a base station in a mobile cellular telecommunication system, a wireless communications device, a hand-portable electronic device, a location/position tag, a hyper tag etc. The apparatus can be embodied by a computing device, not least such as those mentioned above. However, in some examples, the apparatus can be embodied as a chip, chip set or module, i.e., for use in any of the foregoing.

In one example, the apparatus is embodied on a hand held portable electronic device, such as a mobile telephone, wearable computing device or personal digital assistant, that can additionally provide one or more audio/text/video communication functions (for example tele-communication, video-communication, and/or text transmission (Short Message Service (SMS)/Multimedia Message Service (MMS)/emailing) functions), interactive/non-interactive viewing functions (for example web-browsing, navigation, TV/program viewing functions), music recording/playing functions (for example Moving Picture Experts Group-1 Audio Layer 3 (MP3) or other format and/or (frequency modulation/amplitude modulation) radio broadcast recording/playing), downloading/sending of data functions, image capture function (for example using a (for example in-built) digital camera), and gaming functions.

In examples where the apparatus is provided within a UE 110, the apparatus comprises:

at least one processor 12; and at least one memory 13 including computer program code, the at least one memory 13 and the computer program code configured to, with the at least one processor 12, cause the apparatus at least to perform:

determining a first total amount of energy that has been transmitted by the UE within a first time window; and determining a first transmission power that is allowed for a transmission by the UE within the first time window wherein the first transmission power is determined based, at least in part, on the first total amount of energy that has been transmitted by the UE within the first time window.

In examples where the apparatus is provided within a Radio Access Network, RAN, node, 120, the apparatus comprises:

at least one processor 12; and at least one memory 13 including computer program code, the at least one memory 13 and the computer program code configured to, with the at least one processor 12, cause the apparatus at least to perform:

configuring a User Equipment, UE, to determine a first total amount of energy that has been transmitted by the UE within a first time window; and configuring the UE to determine a first transmission power that is allowed for a transmission by the UE within the first time window wherein the first transmission power is determined based, at least in part, on the first total amount of energy that has been transmitted by the UE within the first time window.

According to some examples of the present disclosure, there is provided a system (for example at least one UE 110 and a RAN node 120).

The above described examples find application as enabling components of: telecommunication systems; tracking systems, automotive systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things (IOT); Vehicle-to-everything (V2X), virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

FIG. 11, illustrates a computer program 14 conveyed via a delivery mechanism 20. The delivery mechanism 20 can be any suitable delivery mechanism, for example, a machine readable medium, a computer-readable medium, a non-transitory computer-readable storage medium, a computer program product, a memory device, a solid-state memory, a record medium such as a Compact Disc Read-Only Memory (CD-ROM) or a Digital Versatile Disc (DVD) or an article of manufacture that comprises or tangibly embodies the computer program 14. The delivery mechanism can be a signal configured to reliably transfer the computer program. The apparatus 10 can receive, propagate or transmit the computer program as a computer data signal.

In certain examples of the present disclosure, there is provided computer program instructions for causing a UE 110 to perform at least the following or for causing performing at least the following:

determining a first total amount of energy that has been transmitted by the UE within a first time window; and determining a first transmission power that is allowed for a transmission by the UE within the first time window wherein the first transmission power is determined based, at least in part, on the first total amount of energy that has been transmitted by the UE within the first time window.

In certain examples of the present disclosure, there is provided computer program instructions for causing a Radio Access Network, RAN, node 120 to perform at least the following or for causing performing at least the following:

configuring a User Equipment, UE, to determine a first total amount of energy that has been transmitted by the UE within a first time window; and configuring the UE to determine a first transmission power that is allowed for a transmission by the UE within the first time window wherein the first transmission power is determined based, at least in part, on the first total amount of energy that has been transmitted by the UE within the first time window.

References to 'computer program', 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Although specific terms are employed herein, they are used in a generic and descriptive sense only and not for purposes of limitation. Features described in the preceding description can be used in combinations other than the combinations explicitly described. Although functions have been described with reference to certain features, those functions can be performable by other features whether described or not. Although features have been described with reference to certain examples, those features can also be present in other examples whether described or not. Accordingly, features described in relation to one example/aspect of the disclosure can include any or all of the features described in relation to another example/aspect of the disclosure, and vice versa, to the extent that they are not mutually inconsistent. Although various examples of the present disclosure have been described in the preceding paragraphs, it should be appreciated that modifications to the examples given can be made without departing from the scope of the invention as set out in the claims. For example, whilst transmissions (and transmission durations) have been described with reference to a transmission over a slot, in other examples, the transmissions (and transmission durations) can be with reference to a transmission over a mini slot or a symbol duration. Likewise, whilst various parameters related to power and energy have been described and defined with respect to certain units, not least for example WattSym(bol) or WattS(econd), it is appreciated that any other suitable units for power and energy can be employed with an appropriate conversion.

The term 'comprise' is used in this document with an inclusive not an exclusive meaning. That is any reference to X comprising Y indicates that X can comprise only one Y or can comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

References to a parameter (for example transmission power) can be replaced by references to "data indicative of", "data defining" or "data representative of" the relevant parameter if not explicitly stated.

In this description, reference has been made to various examples. The description of features or functions in relation to an example indicates that those features or functions are present in that example. The use of the term 'example' or 'for example', 'can' or 'may' in the text denotes, whether explicitly stated or not, that such features or functions are present in at least the described example, whether described as an example or not, and that they can be, but are not necessarily, present in some or all other examples. Thus 'example', 'for example', 'can' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise. That is any reference to X comprising a/the Y indicates that X can comprise only one Y or can comprise more than one Y unless the context clearly indicates the contrary. If it is intended to use 'a' or 'the' with an exclusive meaning then it will be made clear in the context. In some circumstances the use of 'at least one' or 'one or more' can be used to emphasise an inclusive meaning but the absence of these terms should not be taken to infer any exclusive meaning.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

In the above description, the apparatus described can alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims can be suitably combined in any manner apparent to one of ordinary skill in the art.

Each and every claim is incorporated as further disclosure into the specification and the claims are embodiment(s) of the present disclosure. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

What is claimed is:

1. A User Equipment (UE), comprising:

at least one processor; and at least one memory including instructions, wherein the at least one memory and the instructions are configured to, with the at least one processor, cause the user equipment to perform operations comprising:

receive, from a gNodeB (gNB) through a dedicated Radio Resource Control (RRC) signalling, a set of configuration parameters for an energy-based power boost calculation, wherein the set of configuration parameters comprises:

a first time window (TW1) comprising N slots, wherein each of the N slots comprises up to 14 Orthogonal Frequency Division Multiplexing (OFDM) symbols, a second time window (TW2), within the first time window, comprising M slots, wherein each of the M slots comprises up to the 14 OFDM symbols, and wherein a number of M slots is less than a number of N slots, a first parameter value (X1) to enable an adjustment of sharing of an available transmission energy for the first time window over time, wherein the first parameter value (X1) is one of: equal to the number of N slots, less than the number of N slots, or larger than the number of N slots, a second parameter value (X2) to enable an adjustment of sharing of an available transmission energy for the second time window over time, wherein the second parameter value (X2) is one of: equal to the number of M slots, less than the number of M slots, or larger than the number of M slots, a first allowed transmission energy permitted over the first time window, a second allowed transmission energy permitted over the second time window, and a predetermined maximum transmission power permitted for the UE based on Specific Absorption Rate (SAR) and Equivalent Isotropic Radiated Power (EIRP) regulatory limits;

determine a first total amount of energy transmitted by the UE within the first time window prior to a current transmission in an $i^{th}$ slot of the first time window, wherein the first total amount of energy is calculated as a sum of energy transmitted over the OFDM symbols in each of N slots within the first time window prior to the current transmission in the $i^{th}$ slot;

determine a second total amount of energy transmitted by the UE within the second time window prior to the current transmission in the $i^{th}$ slot, wherein the second total amount of energy is calculated as a sum of energy transmitted over the OFDM symbols in each of M slots within the second time window prior to the current transmission in the $i^{th}$ slot;

determine a number of symbols to be transmitted in the ith slot; and determine a first transmission power allowed for the current transmission in the ith slot of the first time window, by;

calculating a first available transmission energy available for the current transmission in the $i^{th}$ slot with respect to the first time window as a difference between the first allowed transmission energy and the determined first total amount of energy and dividing the difference between the first allowed transmission energy and the determined first total amount of energy by the first parameter value;

calculating a second available transmission energy available for the current transmission in the $i^{th}$ slot with respect to the second time window as a difference between the second allowed transmission energy and the determined second total amount of energy and dividing the difference between the second allowed transmission energy and the determined second total amount of energy by the second parameter value;

determining a final available transmission energy as the minimum of the first available transmission energy and the second available transmission energy;

calculating a third transmission power for the current transmission in the $i^{th}$ slot by dividing the determined final available transmission energy by the determined number of symbols to be transmitted in the $i^{th}$ slot; and determining the first transmission power as a minimum of the third transmission power and the predetermined maximum transmission power.

2. The UE of claim 1, wherein the determination of the first total amount of energy and the second total amount of energy is performed iteratively using an Infinite Impulse Response (IIR) filter.

3. The UE of claim 2, wherein determining the first total amount of energy transmitted within the first time window comprises, for each of the N slots prior to the ith slot, determining a respective transmission duration based on a respective number of OFDM symbols transmitted in the slot, and accumulating energy as a product of slot transmit power and the determined transmission duration.

4. The UE of claim 3, wherein the first allowed transmission energy permitted over the first time window is computed based on an assumed contiguous uplink transmission over the N slots at a nominal transmit power associated with a power class of the UE.

5. The UE of claim 4, wherein the second allowed transmission energy permitted over the second time window is configured as a predefined fraction of the first allowed transmission energy permitted over the first time window.

6. The UE of claim 5, wherein determining the first total amount of energy transmitted by the UE within the first time window is performed using an iterative Infinite Impulse Response (IIR) filter having a first decay coefficient, and wherein determining the second total amount of energy transmitted by the UE within the second time window is performed using an iterative IIR filter having a second decay coefficient greater than the first decay coefficient.

7. The UE of claim 6, wherein the ith slot is within the second time window, and wherein the second time window is a trailing sub-window of the first time window that is temporally aligned with the ith slot.

8. The UE of claim 7, further comprising updating, based on the determined first transmission power, a configured maximum output power parameter used by an uplink power control procedure for at least one of Physical Uplink Shared Channel (PUSCH) transmission or Physical Uplink Control Channel (PUCCH) transmission.

9. The UE of claim 8, further comprising transmitting, to the gNB, a report indicative of at least one of (i) the determined first total amount of energy for the first time window, (ii) the determined first transmission power for the ith slot, or (iii) a request to adjust a maximum duty cycle for the UE, wherein the report is carried in at least one of a Power Headroom Report (PHR) Medium Access Control Control Element (MAC CE) or a Buffer Status Report (BSR) MAC CE.

10. The UE of claim 9, wherein the predetermined maximum transmission power permitted for the UE is applied as an Effective Isotropic Radiated Power (EIRP) cap by adding an antenna/beamforming gain to the third transmission power prior to applying the minimum operation.

11. The UE of claim 10, further comprising determining the number of symbols to be transmitted in the ith slot based on uplink scheduling information received from the gNB, and performing the energy-based power boost calculation at an OFDM-symbol granularity to derive the first transmission power for the current transmission.

12. A method for a User Equipment (UE), the method comprising:

receiving, from a gNodeB (gNB) through a dedicated Radio Resource Control (RRC) signalling, a set of configuration parameters for an energy-based power boost calculation, wherein the set of configuration parameters comprises:

a first time window (TW1) comprising N slots, wherein each of the N slots comprises up to 14 Orthogonal Frequency Division Multiplexing (OFDM) symbols, a second time window (TW2), within the first time window, comprising M slots, wherein each of the M slots comprises up to the 14 OFDM symbols, and wherein a number of M slots is less than a number of N slots, a first parameter value (X) to enable an adjustment of sharing of an available transmission energy for the first time window over time, wherein the first parameter value (X1) is one of: equal to the number of N slots, less than the number of N slots, or larger than the number of N slots, a second parameter value (X2) to enable an adjustment of sharing of an available transmission energy for the second time window over time, wherein a the second parameter value (X2) is one of: equal to the number of M slots, less than the number of M slots, or larger than the number of M slots, a first allowed transmission energy ($E_{allowedTx(TW1)}$) permitted over the first time window, a second allowed transmission energy ($E_{allowedTx(TW2)}$) permitted over the second time window, and a predetermined maximum transmission power ($P_{regulated}$) permitted for the UE based on Specific Absorption Rate (SAR) and Equivalent Isotropic Radiated Power (EIRP) regulatory limits;

determining a first total amount of energy ($E_{Tx(TW1)}$) transmitted by the UE within the first time window prior to a current transmission in an $i^{th}$ slot of the first time window, wherein the first total amount of energy is calculated as a sum of energy transmitted over the OFDM symbols in each of the N slots within the first time window prior to the current transmission in the $i^{th}$ slot;

determining a second total amount of energy ($E_{Tx(TW2)}$) transmitted by the UE within the second time window prior to the current transmission in the $i^{th}$ slot, wherein the second total amount of energy is calculated as a sum of energy transmitted over the OFDM symbols in each of the M slots within the second time window prior to the current transmission in the $i^{th}$ slot;

determining a number of symbols to be transmitted in the ith slot; and determining a first transmission power ($P_{maxTx(i)}$) allowed for the current transmission in the $i^{th}$ slot of the first time window, by;

calculating a first available transmission energy ($E_{available(i)}$) available for the current transmission in the $i^{th}$ slot with respect to the first time window as a difference between the first allowed transmission energy ($E_{allowedTx(TW1)}$) and the determined first total amount of energy ($E_{Tx(TW1)}$) and dividing the difference between the first allowed transmission energy ($E_{allowedTx(TW1)}$) and the determined first total amount of energy ($E_{Tx(TW1)}$) by the first parameter value (X);

calculating a second available transmission energy ($E_{available(i)TW2}$) available for the current transmission in the $i^{th}$ slot with respect to the second time window as a difference between the second allowed transmission energy ($E_{allowedTx(TW2)}$) and the determined second total amount of energy ($E_{Tx(TW2)}$) and dividing the difference between the second allowed transmission energy ($E_{allowedTx(TW2)}$) and the determined second total amount of energy ($E_{Tx(TW2)}$) by the second parameter value ($X_2$);

determining a final available transmission energy as the minimum of the first available transmission energy ($E_{available(i)}$) and the second available transmission energy ($E_{available(i)TW2}$);

calculating a third transmission power for the current transmission in the $i^{th}$ slot by dividing the determined final available transmission energy by the determined number of symbols to be transmitted in the $i^{th}$ slot; and determining the first transmission power as a minimum of the third transmission power and the predetermined maximum transmission power.

13. A non-transitory computer readable medium comprising computer program instructions for a User Equipment (UE) which, when executed by an apparatus, cause the UE at least to perform operations comprising:

receiving, from a gNodeB (gNB) through a dedicated Radio Resource Control (RRC) signalling, a set of configuration parameters for an energy-based power boost calculation, wherein the set of configuration parameters comprises:

a first time window (TW1) comprising N slots, wherein each of the N slots comprises up to 14 Orthogonal Frequency Division Multiplexing (OFDM) symbols, a second time window (TW2), within the first time window, comprising M slots, wherein each of the M slots comprises up to the 14 OFDM symbols, and wherein a number of M slots is less than a number of N slots, a first parameter value (X) to enable an adjustment of sharing of an available transmission energy for the first time window over time, wherein a the first parameter value (X1) is one of: equal to the number of N slots, less than the number of N slots, or larger than the number of N slots, a second parameter value (X2) to enable an adjustment of sharing of an available transmission energy for the second time window over time, wherein the second parameter value (X2) is one of: equal to the number of M slots, less than the number of M slots, or larger than the number of M slots, a first allowed transmission energy ($E_{allowedTx(TW1)}$) permitted over the first time window, a second allowed transmission energy ($E_{allowedTx(TW2)}$) permitted over the second time window, and a predetermined maximum transmission power ($P_{regulated}$) permitted for the UE based on Specific Absorption Rate (SAR) and Equivalent Isotropic Radiated Power (EIRP) regulatory limits;

determining a first total amount of energy ($E_{Tx(TW1)}$) transmitted by the UE within the first time window prior to a current transmission in an $i^{th}$ slot of the first time window, wherein the first total amount of energy is calculated as a sum of energy transmitted over the OFDM symbols in each of the N slots within the first time window prior to the current transmission in the $i^{th}$ slot;

determining a second total amount of energy ($E_{Tx(TW2)}$) transmitted by the UE within the second time window prior to the current transmission in the $i^{th}$ slot, wherein the second total amount of energy is calculated as a sum of energy transmitted over the OFDM symbols in each of the M slots within the second time window prior to the current transmission in the $i^{th}$ slot;

determining a number of symbols to be transmitted in the ith slot; and determining a first transmission power ($P_{maxTx(i)}$) allowed for the current transmission in the $i^{th}$ slot of the first time window, by;

calculating a first available transmission energy ($E_{available(i)}$) available for the current transmission in the $i^{th}$ slot with respect to the first time window as a difference between the first allowed transmission energy ($E_{allowedTx(TW1)}$) and the determined first total amount of energy ($E_{Tx(TW1)}$) and dividing the difference between the first allowed transmission energy ($E_{allowedTx(TW1)}$) and the determined first total amount of energy ($E_{Tx(TW1)}$) by the first parameter value (X);

calculating a second available transmission energy ($E_{available(i)TW2}$) available for the current transmission in the $i^{th}$ slot with respect to the second time window as a difference between the second allowed transmission energy ($E_{allowedTx(TW2)}$) and the determined second total amount of energy and dividing the difference between the second allowed transmission energy ($E_{allowedTx(TW2)}$) and the determined second total amount of energy ($E_{Tx(TW2)}$) by the second parameter value ($X_2$);

determining a final available transmission energy as the minimum of the first available transmission energy ($E_{available(i)}$) and the second available transmission energy ($E_{available(i)TW2}$);

calculating a third transmission power for the current transmission in the $i^{th}$ slot by dividing the determined final available transmission energy by the determined number of symbols to be transmitted in the $i^{th}$ slot; and determining the first transmission power as a minimum of the third transmission power and the predetermined maximum transmission power.

* * * * *